(12) United States Patent
Venkatraman et al.

(10) Patent No.: US 9,131,347 B2
(45) Date of Patent: Sep. 8, 2015

(54) UTILIZING A PRESSURE PROFILE TO DETERMINE A LOCATION CONTEXT IDENTIFIER

(71) Applicant: QUALCOMM Incorporated, San Diego, CA (US)

(72) Inventors: Sai Pradeep Venkatraman, Santa Clara, CA (US); Weiyi Liu, San Jose, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 14/020,144

(22) Filed: Sep. 6, 2013

(65) Prior Publication Data

US 2014/0323160 A1    Oct. 30, 2014

Related U.S. Application Data

(60) Provisional application No. 61/816,336, filed on Apr. 26, 2013.

(51) Int. Cl.
| | |
|---|---|
| *H04W 4/02* | (2009.01) |
| *G01C 21/20* | (2006.01) |
| *G01S 5/02* | (2010.01) |
| *G01C 5/06* | (2006.01) |
| *H04W 4/04* | (2009.01) |

(52) U.S. Cl.
CPC ............... *H04W 4/028* (2013.01); *G01C 5/06* (2013.01); *G01C 21/206* (2013.01); *G01S 5/0252* (2013.01); *H04W 4/025* (2013.01); *H04W 4/043* (2013.01)

(58) Field of Classification Search
CPC ............................ H04W 4/043; H04W 4/025
USPC ........... 455/456.6, 457, 556.1–2; 340/426.19, 340/426.22, 539.13
See application file for complete search history.

(56) References Cited

U.S. PATENT DOCUMENTS

| | | |
|---|---|---|
| 7,162,368 B2 | 1/2007 | Levi et al. |
| 8,311,769 B2 | 11/2012 | Yuen et al. |
| 2011/0106449 A1 | 5/2011 | Chowdhary et al. |
| 2011/0200023 A1 | 8/2011 | Murray et al. |
| 2012/0072106 A1 | 3/2012 | Han et al. |
| 2012/0072110 A1 | 3/2012 | Venkatraman |
| 2013/0295952 A1* | 11/2013 | Chao et al. ................. 455/456.1 |
| 2014/0194137 A1* | 7/2014 | Do et al. .................... 455/456.1 |

OTHER PUBLICATIONS

International Search Report and Written Opinion—PCT/US2014/035370—ISA/EPO—Sep. 10, 2014.

* cited by examiner

*Primary Examiner* — Cong Tran
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for utilizing a pressure profile to determine a location context identifier (LCI) for use in or with a mobile communication device.

38 Claims, 6 Drawing Sheets

UTILIZING A PRESSURE PROFILE TO DETERMINE A LOCATION CONTEXT IDENTIFIER

CROSS-REFERENCE TO RELATED APPLICATIONS

This application claims the benefit of and priority to U.S. Provisional Patent Application Ser. No. 61/816,336, entitled "System, Method, and/or Devices for Applying Barometric Pressure Measurements and Radio Frequency Measurements for Positioning," filed on Apr. 26, 2013, which is assigned to the assignee hereof and which is expressly incorporated herein by reference.

BACKGROUND

1. Field

The present disclosure relates generally to position or location estimations of mobile communication devices and, more particularly, to utilizing a pressure profile to determine a location context identifier (LCI) for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance data obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, location beacon, etc. via a cellular telephone or other wireless communications network. In some instances, acquired wireless signals may be processed by or at a mobile communication device, and its location may be estimated using known techniques, such as, for example, Advanced Forward Link Trilateration (AFLT), base station identification, or the like.

In an indoor environment, at times, certain mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, blocked, etc.), which may at least partially preclude their use for position estimations. As such, in an indoor environment, different techniques may be employed to enable navigation or location services. For example, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

At times, an indoor location of a mobile communication device may be estimated via radio heat map signature matching, for example, in which current or live characteristics or signatures of wireless signals received at the device are compared with expected or previously measured signal characteristics stored as radio heat map values in a database. For example, during an off-line stage, a particular indoor area may be surveyed, and radio heat map values, such as in the form of observed characteristics of wireless signals indicative of received signal strength (e.g., RSSI, etc.), round-trip delay times (e.g., RTT, etc.), or the like may be collected or compiled. During an on-line stage, a mobile communication device may utilize heat map values, such as stored in a local memory or provided to the device (e.g., for a download, etc.) via a local server, for example, for matching against current or live signal signatures. By finding a signature in a database that more closely matches characteristics exhibited by signals currently received at a mobile communication device, a location associated with a matching signature may be used as an estimated location of the device.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
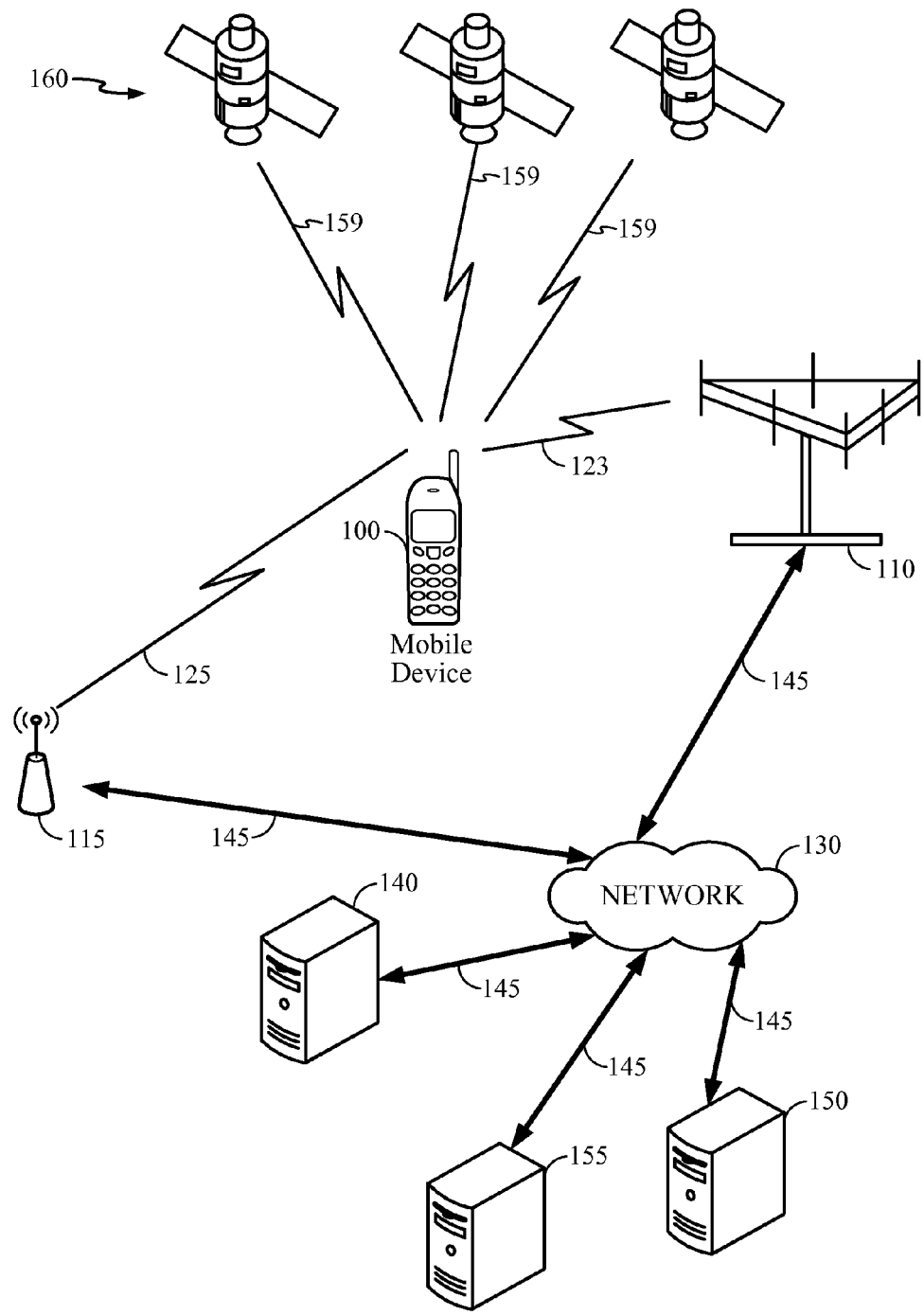
FIG. 1 is a schematic diagram illustrating features associated with an implementation of an example operating environment.

Example implementations relate to techniques for pressure profile-type LCI determination. In one implementation, a method may comprise obtaining, at a mobile device, positioning assistance data comprising a radio heat map defining a plurality of predetermined locations in an area identified via an LCI, the radio heat map comprising one or more expected altitude values for at least some of the predetermined locations relative to a reference altitude value within the area; measuring an altitude of the mobile device relative to the reference altitude value based, at least in part, on one or more barometric pressure measurements obtained via a barometric pressure sensor of the mobile device; and estimating a location of the mobile device based, at least in part, on at least one signal pattern matching operation with respect to the one or more expected altitude values and the altitude measured via the one or more barometric pressure measurements.

In another implementation, an apparatus may comprise a mobile device comprising a wireless transceiver to communicate with a wireless network to obtain positioning assistance data comprising a radio heat map defining a plurality of predetermined locations in an area identified via an LCI, the radio heat map comprising one or more expected altitude values for at least some of the predetermined locations relative to a reference altitude value within the area; a barometric pressure sensor to measure an altitude of the mobile device relative to the reference altitude value based, at least in part, on one or more barometric pressure measurements obtained via the barometric pressure sensor of the mobile device; and one or more processors programmed with instructions to estimate a location of the mobile device based, at least in part, on at least one signal pattern matching operation with respect to the one or more expected altitude values and the altitude measured via the one or more barometric pressure measurements.

In yet another implementation, an apparatus may comprise means for obtaining, at a mobile device, positioning assistance data comprising a radio heat map defining a plurality of predetermined locations in an area identified via an LCI, the radio heat map comprising one or more expected altitude values for at least some of the predetermined locations relative to a reference altitude value within the area; means for measuring an altitude of the mobile device relative to the reference altitude value based, at least in part, on one or more barometric pressure measurements obtained via a barometric pressure sensor of the mobile device; and means for estimating a location of the mobile device based, at least in part, on at least one signal pattern matching operation with respect to the one or more expected altitude values and the altitude measured via the one or more barometric pressure measurements.

In yet another implementation, an article may comprise a non-transitory storage medium having instructions stored thereon executable by a special purpose computing platform to obtain, at a mobile device, positioning assistance data comprising a radio heat map defining a plurality of predetermined locations in an area identified via an LCI, the radio heat map comprising one or more expected altitude values for at least some of the predetermined locations relative to a reference altitude value within the area; measure an altitude of the mobile device relative to the reference altitude value based, at least in part, on one or more barometric pressure measurements obtained via a barometric pressure sensor of the mobile device; and estimate a location of the mobile device based, at least in part, on at least one signal pattern matching operation with respect to the one or more expected altitude values and the altitude measured via the one or more barometric pressure measurements.

In yet another implementation, a method may comprise obtaining, at a mobile device, positioning assistance data comprising a radio heat map defining a plurality of predetermined locations in an area identified via an LCI, the radio heat map comprising one or more expected barometric pressure values for at least some of the predetermined locations relative to a reference barometric pressure value within the area; measuring, via a barometric pressure sensor of the mobile device, a barometric pressure of the mobile device relative to the reference barometric pressure value; and estimating a location of the mobile device based, at least in part, on at least one signal pattern matching operation with respect to the one or more expected barometric pressure values and the barometric pressure of the mobile device measured via the barometric pressure sensor. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for utilizing a pressure profile to determine a location context identifier (LCI) for use in or with a mobile communication device. As used herein, "mobile device," "mobile communication device," "wireless device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations or techniques for utilizing a pressure profile to determine an LCI, and that claimed subject matter is not limited in this regard. It should also be noted that the terms "position" and "location" may be used interchangeably herein.

A position fix of a mobile device located in an indoor or like environment may be obtained based, at least in part, on positioning assistance data that may be selectively provided to a mobile device, such as by an indoor navigation system, location or positioning assistance server, or the like. In some instances, positioning assistance data may comprise, for example, an electronic digital map of an indoor or like area of interest identifiable via one or more location context identifiers. As used herein, a location context identifier (LCI) may refer to an identifier for a set of geographically linked information associated with a locally defined geographic area. A locally defined geographic area may include, for example, a building, a particular floor of a building, a certain portion or wing of a building, or like areas that may or may not be mapped according to a global coordinate system. A set of geographically linked information, in an embodiment, may be an annotated map identifiable via one or more LCIs, for example. An electronic digital map identifiable via one or more LCIs may include, for example, indoor features of an area of interest, such as doors, hallways, staircases, elevators, walls, etc., as well as points of interest, such as restrooms, stores, entry ways, pay phones, or the like. An electronic digital map identifiable via one or more LCIs may also include, for example, a respective location as well as associated signal parameters of wireless transmitters (e.g., access points, etc.) detectable within an LCI. One or more electronic digital maps and LCIs may, for example, be stored at one or more suitable servers to be accessible by a mobile device, such as via a selection of a Uniform Resource Locator (URL), just to illustrate one possible implementation. By obtaining a digital map of an indoor or like area of interest, such as identified via one or more relevant LCIs, for example, a mobile device may be capable of overlaying its current location over the displayed map of the area so as to provide an associated user with additional context, frame of reference, or the like.

In some instances, positioning assistance data may include, for example, one or more radio heat maps constructed for an indoor or like environment. A radio heat map may, for example, be provided in the form of radio heat map values or like metadata representing observed characteristics of wireless signals or so-called signal "signatures" indicative of expected signal strength (e.g., RSSI, etc.), round-trip delay times (e.g., RTT, etc.), or other characteristics at particular locations in an indoor or like area of interest. A radio heat map may comprise, for example, a grid of points laid over or mapped to a floor plan of an indoor or like area of interest at relatively uniform spacing (e.g., two-meter separation of neighboring grid points, etc.) and represent expected signal signatures at these points. In some instances, a radio heat map may, for example, be provided in the form of geographically linked information identified via an LCI, just to illustrate another possible implementation. A radio heat map may facilitate or support measurements of ranges to one or more wireless transmitters, such as one or more access points, for example, positioned at known fixed locations within an indoor or like area of interest. Thus, for a known wireless transmitter, a radio heat map may, for example, associate a particular grid point with a heat map value representative of an expected signal signature at the grid point. As such, heat map values associated with one or more known access points may, for example, enable a mobile device to correlate or associate observed signal signatures with locations within an indoor or like area of interest.

At times, positioning assistance data (e.g., locations of wireless transmitters, radio heat maps, digital maps for display, routing graphs, etc.) for a relatively large or multi-story indoor or like environment may be quite voluminous or comprehensive, which may lead to increased processing times, affect power consumption of a mobile device, or the like. For example, at times, there may be uncertainty as to a particular floor (e.g., of a shopping mall, etc.) on which a mobile device is located. To resolve this uncertainty, a mobile device may access or download multiple radio heat maps, digital maps, etc., such as for each candidate LCI associated with respective floors, for example. This may be time-consuming, waste network bandwidth, memory or power of a mobile device, or the like. In addition, at times, due, at least in part, to limited memory resources, coverage or metadata transfer plan, etc., a mobile device may be unable to reliably receive or download a comprehensive radio heat map into a local memory, for example.

Thus, in some instances, such as in relatively large or multi-story indoor or like environments, for example, it may be useful to resolve or determine a general area (e.g., a particular floor, wing of a building, etc.) of where a mobile device may be located. A mobile device may then be provided with smaller, localized positioning assistance data for use in that particular area (e.g., a portion of a heat map, locations of wireless transmitters on a particular floor, a digital map identified via one or more relevant LCIs, etc.). At times, a mobile device may, for example, resolve its location as being in a particular portion of an interior area, particular floor of a building, etc. by acquiring signals from one or more wireless transmitters positioned at known fixed locations. For example, a mobile device may acquire a MAC address or other information modulating a signal transmitted by a wireless transmitter (e.g., an IEEE std. 802.11 access point, etc.) located within an acquisition range of the mobile device. With acquisition of signals transmitted by a sufficient number of wireless transmitters, a mobile device may, for example, infer or determine that its location is within a particular area of a larger indoor or like environment. A mobile device may then request or access smaller-sized positioning assistance data applicable to that particular area, such as via a suitable server, for example.

At times, resolving or determining a particular portion of an interior area, such as a particular floor on which a mobile device is located, for example, may present a number of challenges. For example, in some instances, RSSI, RTT, or like signal signatures may not be available. Signal signatures may not be available if, for example, requisite wireless signals are attenuated or otherwise affected in some manner, such as insufficient, weak, fragmentary, unsupported, etc., so as to preclude their use in one or more position estimation operations or processes. To illustrate, structural elements of some interior areas (e.g., floors, walls, windows, dividers, etc.) may be relatively dense and, as such, may be prone to multipath or fading effects, for example, which may preclude a mobile device from receiving or processing requisite wireless signals. In addition, emitted wireless signals may oscillate or propagate between adjacent floors of a particular interior area, and, as such, may be acquired by a mobile device on any one of multiple floors of the area. This may, for example, make correlating or associating observed signal signatures with a particular floor within a multi-story indoor or like environment more challenging.

In some instances, to resolve or determine a particular portion of an interior area, such as a particular floor on which a mobile device is located, for example, it may be useful to determine a barometric pressure and/or altitude of the mobile device. For example, one or more barometric pressure measurements may be obtained, such as at an associated barometric pressure sensor, and may be converted to altitude using any suitable computation or technique. Computing an altitude of a mobile device from barometric pressure measurements, however, may be unreliable or less useful since, at times, a mobile device may not be capable of determining a reference pressure with respect to a particular indoor or like area of interest by itself. In this context, a reference pressure may refer to a baseline sea level pressure that may, for example, account for current or local weather or environmental conditions. In some instances, a reference pressure may be representative of or be equivalent to an air pressure at mean sea level (MSL), such as defined in terms of the properties of the International Standard Atmosphere (ISA), for example. Because a reference pressure may vary depending on local conditions (e.g., air temperature, density, etc.), at times, it may be difficult to correlate a barometric pressure and/or altitude of a mobile device with a particular floor within a multi-story indoor or like environment. Accordingly, it may be desirable to develop one or more methods, systems, or apparatuses that may implement more effective or efficient indoor location or navigation techniques, which may include resolving or determining a particular portion of an interior area, such as a particular floor on which a mobile device is located, for example.

Thus, as will be described in greater detail below, in an implementation, a pressure profile for a particular indoor or like area of interest, such as a particular floor identified via an LCI, for example, may be obtained and used, at least in part, to identify certain features on the floor, such as sunken or raised levels, stairs, ramps, or the like. These features may, for example, reflect unique or distinguishable pattern of barometric pressure and/or altitude variations and, as such, may assist, at least in part, in resolving or determining a particular floor within a multi-story indoor or like environment, as will also be seen. In some instances, a pressure profile may comprise, for example, a history of relative barometric pressure measurements and/or relative altitude values converted from one or more barometric pressure measurements obtained over a suitable time interval, such as while a user travels within an indoor or like area of interest. Thus, it should be noted that even though certain implementations, operations, plots, etc. discussed or illustrated herein may refer to or reference relative altitude, relative barometric pressure may, for example, be used, in whole or in part, to determine one or more LCIs without deviating from the scope of claimed subject matter. At times, a pattern of relative altitude values (e.g., a pressure profile, etc.) may be compared with a signal pattern of expected altitude values, for example, that may be provided or otherwise made available in combination with or as part of a radio heat map or like positioning assistance data. By identifying or selecting a pattern of expected altitude values that most closely matches a signal pattern of an obtained pressure profile, a location of a mobile device, such as being on a particular floor identified via an LCI associated with the matching pattern, for example, may be estimated. In some instances, a signal pattern of an obtained pressure profile may, for example, be mapped against a coarse or approximate location of a mobile device, as will also be seen.

FIG. 1 is a schematic diagram illustrating features associated with an implementation of an example operating environment capable of facilitating or supporting one or more processes or operations for utilizing a pressure profile to determine an LCI. It should be appreciated that an operating environment is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftops, patios, or the like. At times, one or more operations or techniques described herein may be performed, at least in part, in an outdoor environment.

As illustrated, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one of several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, mobile device 100 may transmit radio signals to, and receive radio signals from, a wireless communication network. In one example, mobile device 100 may communicate with a cellular communication network by transmitting wireless signals to, or receiving wireless signals from, a base station transceiver 110 over a wireless communication link 123. Similarly, mobile device 100 may transmit wireless signals to, or receive wireless signals from a local transceiver 115 over a wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth® network). In another example implementation, local transceiver 115 may comprise a femtocell transceiver capable of facilitating communication on link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150, and 155 over a network 130 through links 145. Servers 140, 150, and 155 may represent any suitable type of servers capable of facilitating or supporting one or more processes or operations discussed herein. For example, servers 140, 150, and 155 may comprise LCI servers, map servers, positioning assistance servers, information servers, or the like. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 150 (e.g., via a network interface, etc.). In another implementation, network 130 may comprise cellular communication network infrastructure such as, for example, a base station controller or master switching center (not shown) to facilitate mobile cellular communication with mobile device 100.

In particular implementations, and as discussed herein, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT), observed time difference of arrival (OTDOA), or the like. In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT, OTDOA, or the like. For example, servers 140, 150 or 155 may include a base station almanac (BSA) which indicates locations and identities of cellular base stations in a particular region or regions.

In particular environments such as indoor environments or urban canyons, mobile device 100 may not be capable of acquiring signals 159 from a sufficient number of SPS satellites 160 or perform AFLT, OTDOA, etc. to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI), round trip time (RTT), or the like. In alternative implementations, mobile device 100 may obtain an indoor position fix by applying characteristics of acquired signals to a radio heat map indicating expected RSSI, RTT, or like signatures at particular locations in an indoor area. In particular implementations, a radio heat map may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. In some instances, in addition to having an expected RSSI or RTT signature, a node in a radio heat map may have a layer indicating relative altitude between nodes, such as discussed below. It should be understood, however, that these are merely examples of a radio heat map, and that claimed subject matter is not limited in this respect.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI, RTT, or the like. Other positioning assistance data to aid indoor positioning operations may include radio heat maps (e.g., with relative altitude values, etc.), magnetic heat maps, routing graphs, just to name a few examples. Other assistance data received by mobile device 100 may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, mobile device 100 may, for example, overlay its current location over the displayed map to provide the user with additional context, as was indicated.

In one implementation, positioning assistance data, such as, for example, a radio heat map, routing graph, digital map, or the like may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations or motion trajectories according to a motion model (e.g., according to a particle filter or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) or environment sensors (e.g., temperature sensors, microphones, barometric pressure sensors, ambient light sensors, camera imagers, etc.) in estimating a location or motion state of mobile device 100.

According to an embodiment, mobile device 100 may access positioning assistance data through servers 140, 150 or 155 by, for example, requesting the data through selection of a universal resource locator (URL), as previously mentioned. The terms "positioning assistance data" and "indoor navigation assistance data" may be used interchangeably herein. In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor navigation assistance data for all areas served by servers 140, 150 or 155 impractical or infeasible, a request for indoor navigation assistance data from mobile device 100 may indicate a rough or course estimate of a location of mobile device 100. Mobile device 100 may then be provided indoor navigation assistance data covering areas including or proximate to the rough or course estimate of the location of mobile device 100.

In one particular implementation, a request for indoor navigation assistance data from mobile device 100 may specify a location context identifier (LCI), as was indicated. Such an LCI may be associated with a locally defined area such as, for example, a particular floor of a building or other indoor area which is not mapped according to a global coordinate system. In one example server architecture, upon entry of an area, mobile device 100 may request a first server, such as server 140, to provide one or more LCIs covering the area or adjacent areas. Here, the request from mobile device 100 may include a rough location of mobile device 100 such that the requested server may associate the rough location with areas covered by known LCIs, and then transmit those LCIs to mobile device 100. Mobile device 100 may then use the received LCIs in subsequent messages with a different server, such as server 150, for obtaining navigation assistance data relevant to an area identifiable by one or more LCIs, as discussed above (e.g., digital maps, locations and identifies of transmitters, radio heat maps, routing graphs, etc.). In some instances, servers 140, 150, or 155 may be merged or combined in some manner (e.g., by a carrier, service provider, etc.), in which case LCI determination or association may, for example, be performed or carried out internally, such as on an appropriate server(s). At times, servers 140, 150, or 155 may, for example, provide multiple LCIs associated with an area of interest, which may be based, at least in part, on signal characteristics received from wireless transmitters (e.g., access points, etc.) mapped to multiple LCI, rough location of mobile device 100, or the like.

It should be noted that even though a certain number of computing platforms, devices, transmitters, etc. are illustrated herein, any number of suitable computing platforms, devices, transmitters, etc. may be implemented to facilitate or otherwise support one or more techniques or processes associated with an example operating environment of FIG. 1. For example, at times, network 130 may be coupled to one or more wired or wireless communications networks (e.g., Wi-Fi, etc.) so as to enhance a coverage area for communications with mobile device 100, base station transceiver 110, local transceiver 115, servers 140, 150, and 155, or the like. In some instances, network 130 may facilitate or support femtocell-based operative regions of coverage, for example. Again, these are merely example implementations, and claimed subject matter is not limited in this regard.

Figure 2:
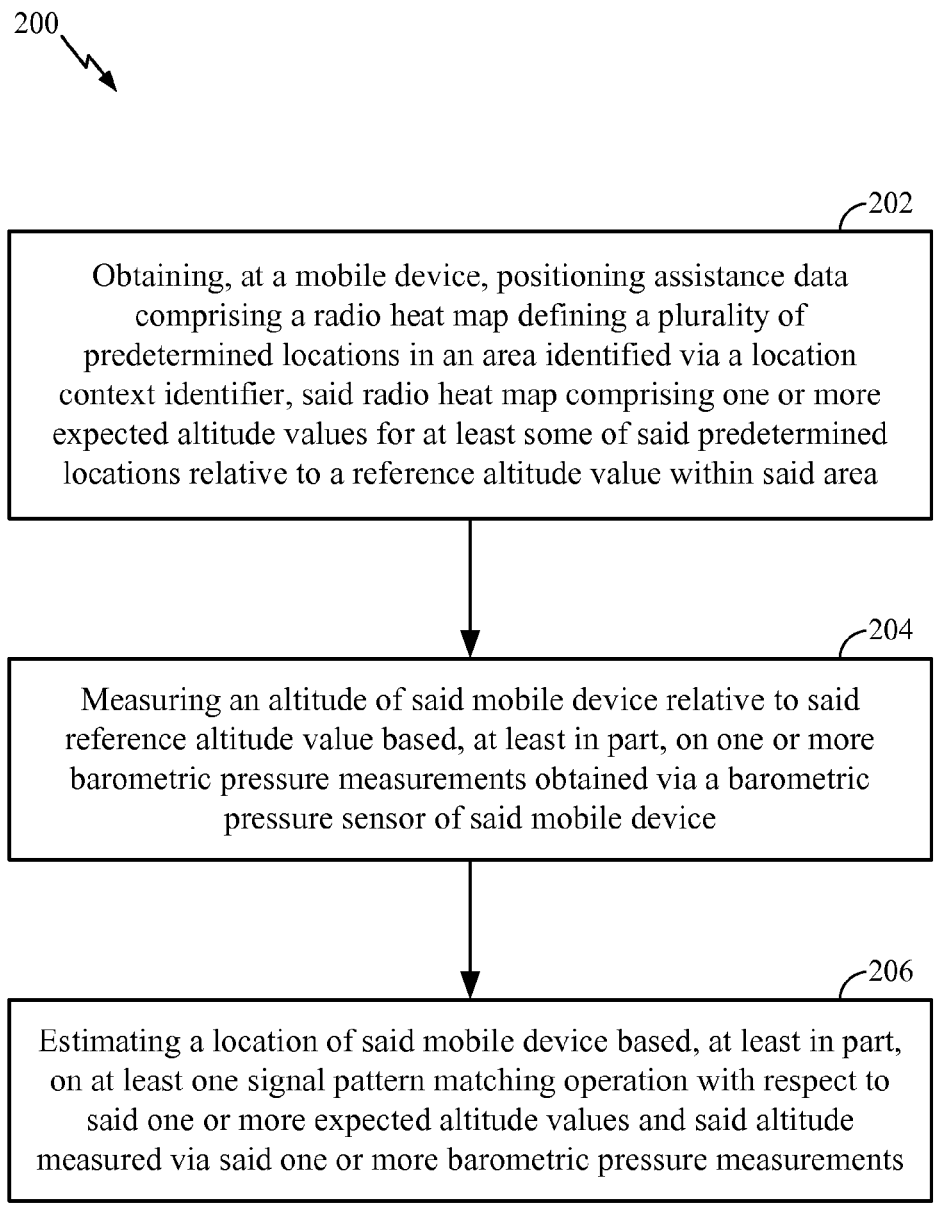
FIG. 2 is a flow diagram illustrating an implementation of an example process that may be performed to facilitate or support techniques for utilizing a pressure profile to determine an LCI.

With this in mind, attention is now drawn to FIG. 2, which is a flow diagram illustrating an implementation of an example process 200 that may be performed, in whole or in part, to facilitate or support one or more operations or techniques for utilizing a pressure profile to determine an LCI for use in or with a mobile device, such as mobile device 100 of FIG. 1, for example. As was indicated, determining a relevant LCI capable of identifying a portion of an interior area, such as a particular floor within a multi-story building, for example, may help with more effective of efficient localization of a mobile device. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Figure 3:
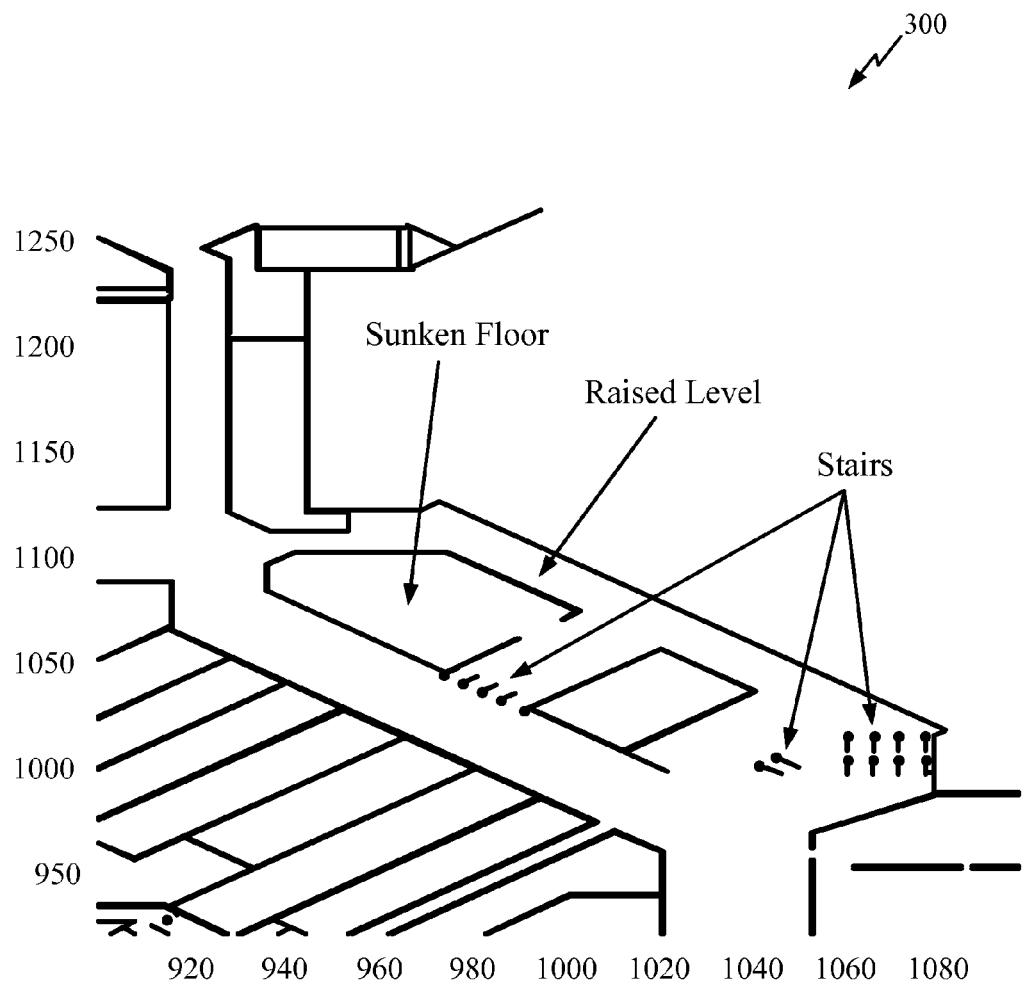
FIG. 3 is a schematic illustration of an implementation of features of an example multi-level indoor area.

Example process 200 may, for example, begin at operation 202 with obtaining, at a mobile device, positioning assistance data comprising a radio heat map defining a plurality of predetermined locations in an area identified via an LCI. In some instances, a radio heat map may comprise, for example, one or more expected altitude values for at least some of the predetermined locations relative to a reference altitude value within the area. For example, as illustrated in FIG. 3, at times, an example multi-level indoor area 300, such as identified via a relevant LCI, may have a number of features, such as raised levels, sunken floors, stairs, or the like. As also seen, a raised level of area 300 may be open to another area below (e.g., a sunken or bottom floor, etc.), for example, which may allow a user to travel to a lower level using stairs. Thus, for area 300, a radio heat map comprising, for example, a layer of relative altitude values for at least some of predetermined locations, such as raised levels, sunken floors, stairs, etc., may be constructed and used, at least in part, to detect specific transitions between these locations. As was indicated, in various embodiments, altitude may be expressed in terms of meters, feet, barometric pressure, or other means known in the art.

As used herein, "predetermined location" may refer to a location associated with a stored signal pattern of one or more characteristics or values of one or more wireless signals or physical phenomena (e.g., air pressure, etc.) received at or obtained by a mobile device. In some instances, a predetermined location may comprise, for example, any suitable measurement location. Thus, a plurality of locations associated with a respective plurality of signal patterns, such as stored in a suitable database, for example, may be referred to as a plurality of predetermined locations. Also, the term "signal pattern" or "pattern," as used herein, may refer to one or more characteristics or values of one or more wireless signals or physical phenomena (e.g., air pressure, etc.) received at or obtained by a mobile device. At times, a signal pattern may include one or more values that were converted from other values or characteristics. For example, a signal pattern may comprise RSSI, RTT, barometric pressure, absolute or relative altitude, pressure or GPS altitude, or like values. In some instances, a number of signal patterns may be observed at any number of locations in order to form a database of signal patterns and their associated predetermined locations. A database of signal patterns may be associated with a mobile device, suitable server, or any combination thereof. It should be noted that RSSI, RTT, barometric pressure, altitude, etc. are merely examples of wireless characteristics or physical phenomena that may be utilized, at least in part, in a pattern matching operation, as discussed below, and claimed subject matter is not limited in this respect. Other wireless signal characteristics or physical phenomena, such as signal phase, ultrasound, etc. may be employed, in whole or in part.

Thus, in at least one implementation, in addition to expected RSSI, RTT, or like values, a node in a radio heat map may comprise, for example, a value indicating relative altitude between certain nodes. To illustrate, in some instances, a lowest or otherwise suitable point within area 300 may, for example, be designated as a reference node with a reference altitude value of 0.0 meters. Other nodes representing at least some of predetermined locations in area 300 may, for example, be respectively designated with expected altitude values relative to this reference altitude value, such as between 0.0 and 1.0 meters. Thus, in some instances, a radio heat map for area 300 may comprise, for example, expected altitude values representing a signal pattern of unique or distinguishable transitions capable of distinctively identifying area 300. Of course, these are merely examples relating to a radio heat map, and claimed subject matter is not so limited.

As used herein, a reference altitude value may refer to some baseline altitude setting, such as represented via a suitable value, for example, that may account for particularities (e.g., floor plan, number of floors or features, weather condition, absolute altitude, air pressure at MSL, etc.) of an indoor or like area of interest. A reference altitude value may be determined, at least in part, experimentally and may be pre-defined or configured, for example, or otherwise dynamically defined in some manner, depending on a particular application, environment, condition, or the like. For example, in some instances, altitude value associated with a recent position fix obtained via an SPS, such as prior to entering an indoor or like area of interest, may be used as a reference altitude value, just to illustrate one possible implementation. By way of example but not limitation, at times, GPS altitude may be used, at least in part. As another possible example, a reference altitude value may be determined via user input, such as by manually setting the value (e.g., to 0.0 meters, etc.) at or from a corresponding physical location (e.g., a lowest floor, etc.), for example. As was indicated, in some instances, a reference barometric pressure may, for example, be used, in whole or in part, such as instead of or in addition to reference altitude, just to illustrate another possible implementation. Here, a barometric pressure value may, for example, be set or selected as a reference value at a known location, such as at or upon entry into an area of interest (e.g., via a barometric pressure reading at a front door of a shopping mall, etc.).

At times, a reference altitude value may, for example, be determined via a combination of suitable wireless signals and barometric pressure measurements. In some instances, radio frequency (RF) or like signals acquired from proximate Wi-Fi access points may, for example, be used, in whole or in part. For example, changes in altitude detected via barometric pressure measurements may be correlated in some manner with changes in acquired RF signals to estimate floor-ceiling separations and, thus, floor to ceiling heights. With structural knowledge of a particular indoor or like environment, an altitude of a bottom floor may, for example, be estimated and designated as a reference point or node with a reference altitude value (e.g., set to 0.0 meters, etc.). Of course, these are merely examples relating to determining a reference altitude value, and claimed subject matter is not so limited. At times, measurement signals obtained from an inertial or motion sensor, such as an accelerometer, for example, may be utilized, at least in part, to determine whether a mobile device is traveling laterally or moving up or down. For example, accelerometer signals indicative of up or down motion may convey that a user of a mobile device is changing floors. If accelerometer signals indicate that a mobile device is traveling laterally for a sufficient or suitable distance, for example, it may be inferred that an associated user is on a floor level, which may allow for mapping one or more suitable or applicable floors. A reference value (e.g., altitude, barometric pressure, etc.) determined with respect to a particular indoor or like area of interest (e.g., a particular shopping mall, etc.) may, for example, be stored in memory of a mobile device or communicated to a suitable server and used, at least in part, for subsequent pattern matching operations.

Referring back to example process 200 of FIG. 2, at operation 204, an altitude of the mobile device relative to the reference altitude value may, for example, be measured based, at least in part, on one or more barometric pressure measurements obtained via a barometric pressure sensor of the mobile device. For example, one or more barometric pressure measurements may be obtained at certain predetermined locations, such as locations corresponding to nodes of an applicable radio heat map, just to illustrate one possible implementation. In some instances, barometric pressure measurements may be obtained over a time interval, such as while an associated user travels within an indoor or like area of interest, for example. These measurements may be converted to a relative altitude, such as using one or more suitable techniques, conversion factors, ratios, adjustments, etc. A time interval may be determined, at least in part, experimentally and may be pre-defined or configured, for example, or otherwise dynamically defined in some manner, depending on a particular application, environment, floor plan, or the like. For example, in some instances, a time interval defining at least one unique or distinguishable transition capable of distinctively identifying a particular LCI may be used, at least in part. As previously discussed, a history of relative altitude values obtained over a time interval at certain predetermined locations may comprise, for example, or be representative of a pressure profile.

With regard to operation 206, a location of the mobile device may, for example, be estimated based, at least in part, on at least one signal pattern matching operation with respect to one or more expected altitude values and relative altitude measured via one or more barometric pressure measurements. For example, at times, a suitable subset of signal patterns may be selected, such as from a database comprising a plurality of candidate signal patterns of expected altitude values associated with predetermined locations identifiable via an LCI. In some instances, a subset of signal patterns may, for example, be selected in response to a determination of a coarse or rough location of a mobile device, as was indicated. Here, selected signal patterns may comprise, for example, patterns associated with predetermined locations within an area defined by a coarse or rough location of a mobile device. As such, a number of signal patterns to be matched may, for example, be reduced to those patterns associated with one or more candidate LCIs identifying an area defined by a coarse or rough location of a mobile device. Thus, one or more signal patterns associated with locations that lay outside of an area defined by a coarse or rough location of a mobile device may, for example, be ignored. This may, for example, reduce an amount of time to produce a result for a given processing resource performing a pattern matching operation, such as a mobile device, server, or any combination thereof. In addition, a reduction in signal patterns involved in a pattern matching operation may improve power consumption of a mobile device due, at least in part, to a reduction in processor workload, for example. Claimed subject matter is not so limited, of course. For example, at times, since users may move or travel within an area of interest rather sporadically (e.g., slow down, pause, continue moving, etc.), a subset of selected signal patterns may comprise, for example, an estimated horizontal distance of travel, such as determined via an inertial or motion sensor (e.g., an accelerometer, etc.) in relation to expected barometric pressure or altitude values. Thus, an estimated horizontal distance of travel may be reflected in a pressure profile for an indoor or like area of interest, as discussed below.

Thus, in an implementation, at least one pattern matching operation may, for example, be performed, at least in part, via utilizing a selected subset of signal patterns. For example, one or more individual patterns from a subset of patterns comprising expected altitude values may be compared with a signal pattern of relative altitude values (e.g., a pressure profile, etc.) to select a closest matching pattern from the subset. If relative altitude values show a unique pattern that matches a signal pattern associated with a candidate LCI, then that LCI may, for example, be selected as indicative of an estimated location of a mobile device.

As was indicated, in at least one implementation, instead of or in addition to altitude, non-converted barometric pressure values (e.g., expected, relative, etc.) may be used, at least in part, for localization. For example, a reference barometric pressure value at a suitable wireless transmitter may be obtained, and a floor level may be ascertained (e.g., from an applicable pressure profile) based, at least in part, on the obtained value. As another example, relative changes (e.g., differences, etc.) in barometric pressure values may be observed by or at a mobile device and may be correlated with particular locations or features capable of uniquely identifying a particular floor within an indoor or like area of interest.

Figure 4:
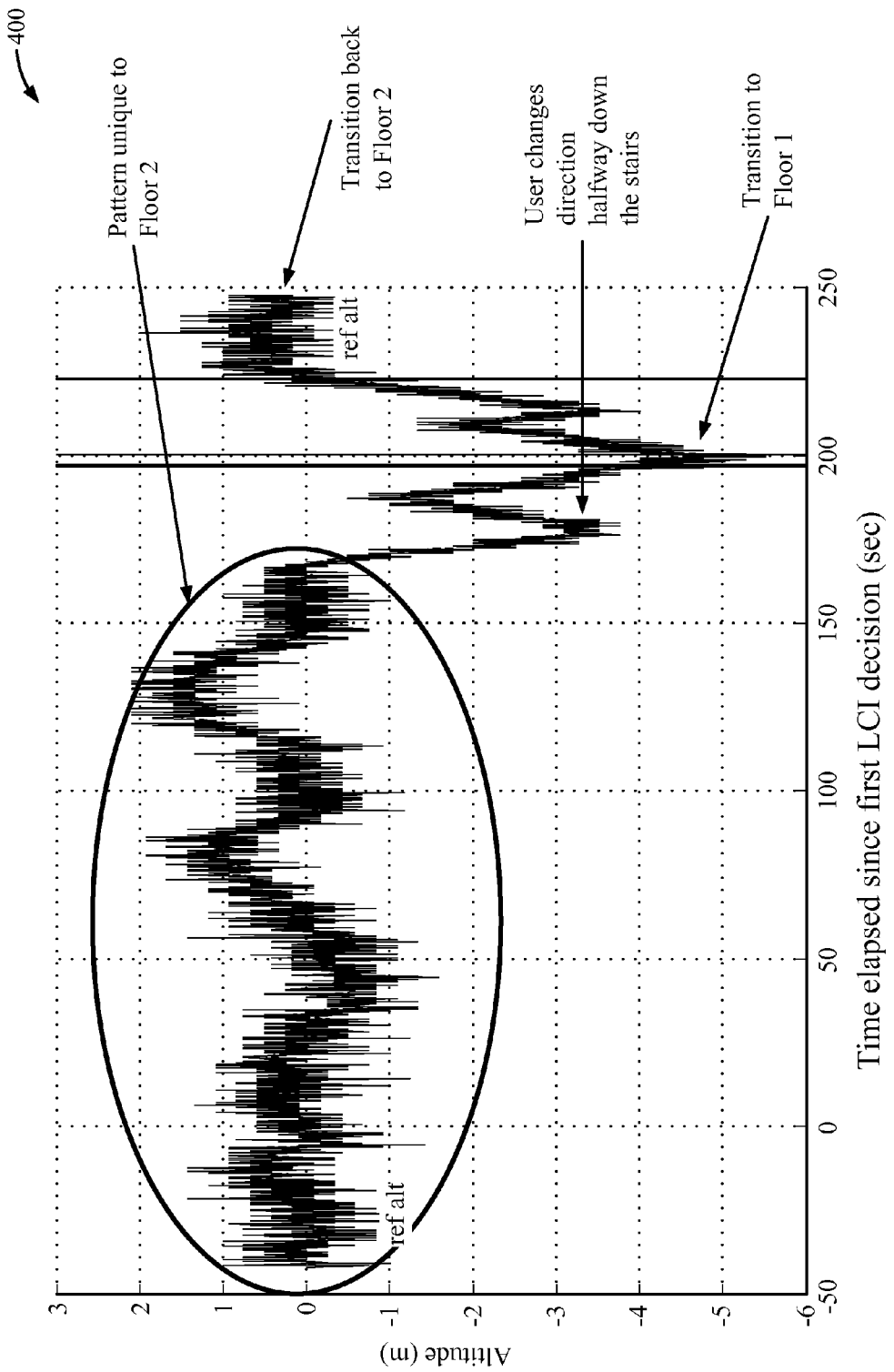
FIG. 4 is an example plot illustrating an implementation of a pressure profile for an indoor area.

FIG. 4 is an example plot 400 illustrating, in one embodiment, a pressure profile obtained for an indoor or like area of interest, such as area 300 of FIG. 3, for example, identifiable via one or more LCIs. As illustrated, a pressure profile may comprise, for example, a history of relative altitude values measured based, at least in part, on one or more barometric pressure measurements obtained over a suitable time interval at certain predetermined locations. It should be appreciated that a pressure profile shown is merely an example to which claimed subject matter is not limited. For example, in some instances, a pressure profile may comprise a history of barometric pressure measurements or values obtained over an estimated horizontal distance of travel between certain predetermined locations within an indoor or like area of interest. At times, a pressure profile may comprise, for example, a history of any changeable or changed quantity (e.g., differences in altitude, barometric pressure, etc.) that may be used, in whole or in part, to uniquely identify a particular floor, as was indicated. For example, a pressure profile may comprise a history of differences between maximum and minimum barometric pressure measurements and/or altitudes corresponding to different heights of floor features so as to uniquely identify a particular floor, just to illustrate another possible implementation. Thus, depending on an implementation, a pattern of relative barometric pressure values or like data comprising a pressure profile may be compared with a signal pattern of expected relative barometric pressure values, etc. that may be provided or otherwise made available in combination with or as part of a radio heat map or like positioning assistance data in a similar fashion.

As seen in FIG. 4, a first portion of plot 400 may comprise, for example, a pattern of relative altitude values (e.g., transitions within an area, etc.) uniquely or distinctively identifying Floor 2, followed by a pattern indicative of a user moving to Floor 1 over stairs, and then followed by a pattern indicative of moving from Floor 1 back to Floor 2. Thus, as discussed above, if a signal pattern comprising expected altitude values, such as communicated to or obtained by a mobile device as part of positioning assistance data, for example, matches a pattern of a first portion of plot 400, it may be determined that a mobile device is located on Floor 2. Accordingly, an LCI associated with Floor 2 or other suitable information (e.g., a digital map, etc.) may, for example, be provided for use by a mobile device. Floor 2 or transitions from Floor 1 to Floor 2, such as indicative of a user taking stairs, for example, and respective associated LCIs, may be determined via respective patterns of relative altitude values in a similar fashion.

Figure 5:
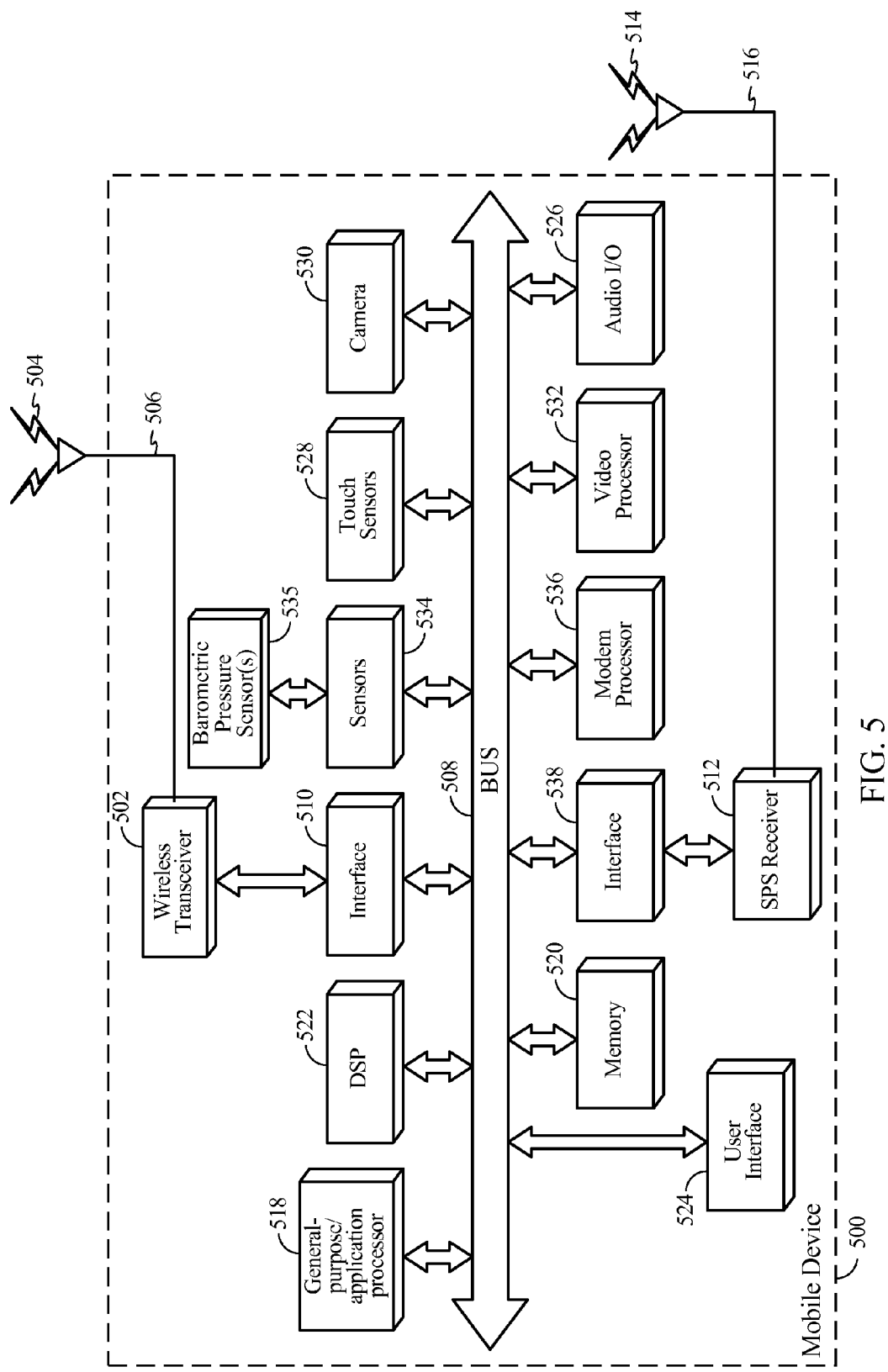
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate or support one or more operations or techniques for utilizing a pressure profile to determine an LCI, such as for more effective or efficient positioning in an indoor or like environment. An example computing environment may comprise, for example, a mobile device 500 that may include one or more features or aspects of mobile device 100 of FIG. 1, though claimed subject matter is not so limited. For example, in some instances, mobile device 500 may comprise a wireless transceiver 502 capable of transmitting or receiving wireless signals, referenced generally at 504, such as via an antenna 506 over a suitable wireless communications network. Wireless transceiver 502 may, for example, be capable of sending or receiving one or more suitable communications, such as one or more communications discussed with reference to FIG. 3, as one possible example. Wireless transceiver 502 may, for example, be coupled or connected to a bus 508 via a wireless transceiver bus interface 510. Depending on an implementation, at times, wireless transceiver bus interface 510 may, for example, be at least partially integrated with wireless transceiver 502. Some implementations may include multiple wireless transceivers 502 or antennas 506 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 500 may, for example, comprise an SPS or like receiver 512 capable of receiving or acquiring one or more SPS or other suitable wireless signals 514, such as via an SPS or like antenna 516. SPS receiver 512 may process, in whole or in part, one or more acquired SPS signals 514 for estimating a location, coarse or otherwise, of mobile device 500. In some instances, one or more general-purpose application processors 518, memory 520, digital signal processor(s) (DSP) 522, or like specialized devices or processors not shown may be utilized to process acquired SPS signals 514, in whole or in part, calculate a location of mobile device 500, such as in conjunction with SPS receiver 512, or the like. Storage of SPS or other signals for implementing one or more positioning operations, such as in connection with one or more techniques for utilizing a pressure profile to determine an LCI, for example, may be performed, at least in part, in memory 520, suitable registers or buffers (not shown). Although not shown, it should be appreciated that in at least one implementation one or more processors 518, memory 520, DSPs 522, or like specialized devices or processors may comprise one or more processing modules capable of obtaining positioning assistance data comprising a radio heat map defining a plurality of predetermined locations in an area identified via an LCI, the radio heat map comprising one or more expected altitude values for at least some of the predetermined locations relative to a reference altitude value within the area; measuring an altitude of a mobile device relative to the reference altitude value based, at least in part, on one or more barometric pressure measurements obtained via a barometric pressure sensor of the mobile device; and estimating a location of the mobile device based, at least in part, on at least one signal pattern matching operation with respect to the one or more expected altitude values and the altitude measured via the one or more barometric pressure measurements. It should also be noted that all or part of one or more processing modules may be implemented using or otherwise including hardware, firmware, software, or any combination thereof.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may, for example, be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as, for example, a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. In some implementations, mobile device 500 may optionally include a dedicated audio input/output (I/O) device 526 comprising, for example, a dedicated speaker, microphone, digital to analog circuitry, analog to digital circuitry, amplifiers, gain control, or the like. It should be understood, however, that this is merely an example of how audio I/O device 526 may be implemented, and that claimed subject matter is not limited in this respect. As seen, mobile device 500 may comprise one or more touch sensors 528 responsive to touching or like pressure applied on a keyboard, touch screen, or the like.

In an implementation, mobile device 500 may comprise, for example, a camera 530, dedicated or otherwise, such as for capturing still or moving imagery, or the like. Camera 530 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 518, DSP 522, or the like. Optionally or alternatively, a video processor 532, dedicated or otherwise, may perform conditioning, encoding, compression, or manipulation of signals representing one or more captured images. Additionally, video processor 532 may, for example, decode or decompress one or more stored images for presentation on a display (not shown) of mobile device 500.

Mobile device 500 may comprise one or more sensors 534 coupled or connected to bus 508, such as, for example, one or more inertial sensors, ambient environment sensors, or the like. Inertial sensors of sensors 534 may comprise, for example, one or more accelerometers (e.g., collectively responding to acceleration of mobile device 500 in one, two, or three dimensions, etc.), gyroscopes or magnetometers (e.g., to support one or more compass or like applications, etc.), etc., just to illustrate a few examples. Ambient environment sensors of mobile device 500 may comprise, for example, one or more temperature sensors, ambient light detectors, camera sensors, microphones, etc., just to name few examples. As also illustrated, mobile device 500 may comprise, for example, one or more barometric pressure sensors 535 capable of measuring barometric pressure and/or altitude of mobile device 500 so as to facilitate or support one or more operations or techniques discussed herein. One or more barometric pressure sensors 535 may be capable of determining one or more LCIs, such as within an indoor or like area of interest, for example, separately or in combination with one or more other sensors of sensors 534 (e.g., inertial, ambient environment, etc.). Sensors 534 and/or 535 may generate analog or digital signals that may be stored in memory 520 and may be processed by DSP 522, processor 518, etc., such as in support of one or more applications directed to positioning or navigation operations, wireless communications, gaming or the like.

In a particular implementation, mobile device 500 may comprise a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
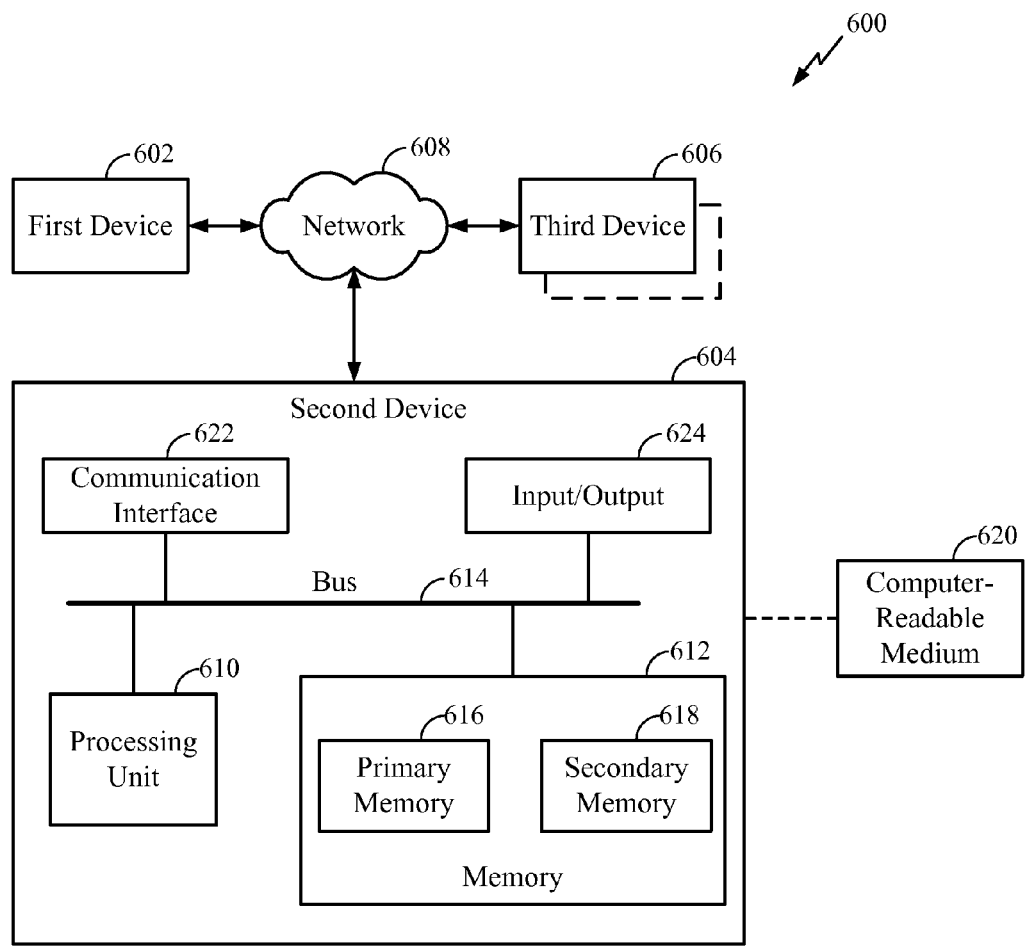
FIG. 6 is a schematic diagram illustrating an implementation of an example computing environment associated with a server.

FIG. 6 is a schematic diagram illustrating an implementation of an example computing environment or system 600 that may be associated with or include one or more servers or other devices capable of partially or substantially implementing or supporting one or more operations or techniques for utilizing a pressure profile to determine an LCI, such as for more effective or efficient positioning in an indoor or like environment, such as discussed above in connection with FIGS. 1-4, for example. Computing environment 600 may include, for example, a first device 602, a second device 604, a third device 606, etc., which may be operatively coupled together via a communications network 608. In some instances, first device 602 may comprise a server capable of providing positioning assistance data, such as, for example, identities or locations of known wireless transmitters, radio heat map having relative altitude values, base station almanac, digital map, LCI, or the like. For example, first device 602 may also comprise a server capable of providing an LCI to a requesting mobile device based, at least in part, on a coarse or rough estimate of a location of the mobile device. First device 602 may also comprise a server capable of providing indoor positioning assistance data relevant to a location of an LCI specified in a request from a mobile device. Second device 604 or third device 606 may comprise, for example, mobile devices, though claimed subject matter is not so limited. For example, in some instances, second device 604 may comprise a server functionally or structurally similar to first device 602, just to illustrate another possible implementation. In addition, communications network 608 may comprise, for example, one or more wireless transmitters, such as access points, femtocells, or the like. Of course, claimed subject matter is not limited in scope in these respects.

First device 602, second device 604, or third device 606 may be representative of any device, appliance, platform, or machine that may be capable of exchanging information over communications network 608. By way of example but not limitation, any of first device 602, second device 604, or third device 606 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter or receiver, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof.

Memory 612 may be representative of any information storage mechanism or appliance. Memory 612 may include, for example, a primary memory 616 and a secondary memory 618. Primary memory 616 may include, for example, a random access memory, read only memory, etc. While illustrated in this example as being separate from processing unit 610, it should be understood that all or part of primary memory 616 may be provided within or otherwise co-located/coupled with processing unit 610. Secondary memory 618 may include, for example, same or similar type of memory as primary memory or one or more information storage devices or systems, such as, for example, a disk drive, an optical disc drive, a tape drive, a solid state memory drive, etc. In certain implementations, secondary memory 618 may be operatively receptive of, or otherwise configurable to couple to, a computer-readable medium 620. Computer-readable medium 620 may include, for example, any non-transitory storage medium that may carry or make accessible information, code, or instructions for one or more of devices in computing environment 600. Computer-readable medium 620 may also be referred to as a storage medium.

Second device 604 may include, for example, a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include, for example, an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

Methodologies described herein may be implemented by various means depending upon applications according to particular features or examples. For example, methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, methodologies may be implemented with modules (e.g., procedures, functions, etc.) having instructions that perform functions described herein. Any computer-readable medium tangibly embodying instructions may be used in implementing methodologies described herein. For example, software codes may be stored in a memory and executed by a processor. Memory may be implemented within the processor or external to the processor. As used herein the term "memory" may refer to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, obtaining positioning assistance data, extending cellular telephone service into a business or home, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example, and may provide a mobile device access to a larger cellular telecommunication network by way of another broadband network, such as the Internet. However, such details relating to femtocells are merely examples, and claimed subject matter is not so limited.

Techniques described herein may be used with an SPS that includes any one of several GNSS or combinations of GNSS. Furthermore, techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal, etc.). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "space vehicle" (SV), as used herein, is intended to include terrestrial transmitters acting as pseudolites, equivalents of pseudolites, and possibly others. The terms "SPS signals" or "SV signals", as used herein, is intended to include SPS-like signals from terrestrial transmitters, including terrestrial transmitters acting as pseudolites or equivalents of pseudolites.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
obtaining, at a mobile device, positioning assistance data comprising a radio heat map defining a plurality of predetermined locations in an area identified via a location context identifier (LCI), said radio heat map comprising one or more expected altitude values for at least some of said predetermined locations relative to a reference altitude value within said area;
measuring an altitude of said mobile device relative to said reference altitude value based, at least in part, on one or more barometric pressure measurements obtained via a barometric pressure sensor of said mobile device; and
estimating a location of said mobile device based, at least in part, on at least one signal pattern matching operation with respect to said one or more expected altitude values and said altitude measured via said one or more barometric pressure measurements.

2. The method of claim 1, wherein said at least one signal pattern matching operation is based, at least in part, on selecting a signal pattern from among a plurality of candidate signal patterns determined for said LCI.

3. The method of claim 2, wherein said selecting said signal pattern from among said plurality of candidate signal patterns comprises comparing said one or more expected altitude values with said altitude measured via said one or more barometric pressure measurements to determine a closest signal pattern match.

4. The method of claim 1, wherein said reference altitude value is determined based, at least in part, on at least one of the following: a recent position fix obtained via a satellite positioning system (SPS); a combination of wireless signals and barometric pressure measurements; user input; or any combination thereof.

5. The method of claim 1, wherein said location of said mobile device is estimated based, at least in part, on a history of said altitude measured via said one or more barometric pressure measurements obtained over a time interval.

6. The method of claim 5, wherein said history of said altitude measured via said one or more barometric pressure measurements comprises a pressure profile for said plurality of predetermined locations within said area.

7. The method of claim 5, wherein said history of said altitude measured via said one or more barometric pressure measurements is obtained while a user of said mobile device travels within said area.

8. The method of claim 1, wherein said radio heat map further comprises at least one of the following: expected received signal strength values at said predetermined locations; expected round trip time values at said predetermined locations; or any combination thereof.

9. The method of claim 1, wherein said at least one signal pattern matching operation is performed in response to a determination of a coarse location of said mobile device.

10. The method of claim 9, wherein said at least one signal pattern matching operation performed in response to said determination of said coarse location of said mobile device is based, at least in part, on selecting a signal pattern from a subset of signal patterns determined for said LCI and stored in a database.

11. The method of claim 1, wherein said one or more expected altitude values are provided in combination with said radio heat map or as a part of said radio heat map.

12. An apparatus comprising:
a mobile device comprising:
a wireless transceiver to communicate with a wireless network to obtain positioning assistance data comprising a radio heat map defining a plurality of predetermined locations in an area identified via a location context identifier (LCI), said radio heat map comprising one or more expected altitude values for at least some of said predetermined locations relative to a reference altitude value within said area;
a barometric pressure sensor to measure an altitude of said mobile device relative to said reference altitude value based, at least in part, on one or more barometric pressure measurements obtained via said barometric pressure sensor of said mobile device; and
one or more processors programmed with instructions to estimate a location of said mobile device based, at least in part, on at least one signal pattern matching operation with respect to said one or more expected altitude values and said altitude measured via said one or more barometric pressure measurements.

13. The apparatus of claim 12, wherein said at least one signal pattern matching operation is based, at least in part, on selecting a signal pattern from among a plurality of candidate signal patterns determined for said LCI.

14. The apparatus of claim 12, wherein said location of said mobile device is estimated based, at least in part, on a history of said altitude measured via said one or more barometric pressure measurements obtained over a time interval.

15. The apparatus of claim 14, wherein said history of said altitude measured via said one or more barometric pressure measurements comprises a pressure profile for said plurality of predetermined locations within said area.

16. The apparatus of claim 12, wherein said at least one signal pattern matching operation is performed in response to a determination of a coarse location of said mobile device.

17. An apparatus comprising:
means for obtaining, at a mobile device, positioning assistance data comprising a radio heat map defining a plurality of predetermined locations in an area identified via a location context identifier (LCI), said radio heat map comprising one or more expected altitude values for at least some of said predetermined locations relative to a reference altitude value within said area;
means for measuring an altitude of said mobile device relative to said reference altitude value based, at least in part, on one or more barometric pressure measurements obtained via a barometric pressure sensor of said mobile device; and
means for estimating a location of said mobile device based, at least in part, on at least one signal pattern matching operation with respect to said one or more expected altitude values and said altitude measured via said one or more barometric pressure measurements.

18. The apparatus of claim 17, wherein said means for estimating said location of said mobile device further comprises means for selecting a signal pattern from among a plurality of candidate signal patterns determined for said LCI.

19. The apparatus of claim 18, wherein said means for selecting said signal pattern from among said plurality of candidate signal patterns further comprises means for comparing said one or more expected altitude values with said altitude measured via said one or more barometric pressure measurements to determine a closest signal pattern match.

20. The apparatus of claim 17, wherein said reference altitude value is determined based, at least in part, on at least one of the following: a recent position fix obtained via a satellite positioning system (SPS); a combination of wireless signals and barometric pressure measurements; user input; or any combination thereof.

21. The apparatus of claim 17, wherein said location of said mobile device is estimated based, at least in part, on a history of said altitude measured via said one or more barometric pressure measurements obtained over a time interval.

22. The apparatus of claim 21, wherein said history of said altitude measured via said one or more barometric pressure measurements comprises a pressure profile for said plurality of predetermined locations within said area.

23. The apparatus of claim 21, wherein said history of said altitude measured via said one or more barometric pressure measurements is obtained while a user of said mobile device travels within said area.

24. The apparatus of claim 17, wherein said radio heat map further comprises at least one of the following: expected received signal strength values at said predetermined locations; expected round trip time values at said predetermined locations; or any combination thereof.

25. The apparatus of claim 17, wherein said at least one signal pattern matching operation is performed in response to a determination of a coarse location of said mobile device.

26. The apparatus of claim 25, wherein said at least one signal pattern matching operation performed in response to said determination of said coarse location of said mobile device is based, at least in part, on selecting a signal pattern from a subset of signal patterns determined for said LCI and stored in a database.

27. The apparatus of claim 17, wherein said one or more expected altitude values are provided in combination with said radio heat map or as a part of said radio heat map.

28. An article comprising:
a non-transitory storage medium having instructions stored thereon executable by a special purpose computing platform to:
obtain, at a mobile device, positioning assistance data comprising a radio heat map defining a plurality of predetermined locations in an area identified via a location context identifier (LCI), said radio heat map comprising one or more expected altitude values for at least some of said predetermined locations relative to a reference altitude value within said area;
measure an altitude of said mobile device relative to said reference altitude value based, at least in part, on one or more barometric pressure measurements obtained via a barometric pressure sensor of said mobile device; and
estimate a location of said mobile device based, at least in part, on at least one signal pattern matching operation with respect to said one or more expected altitude values and said altitude measured via said one or more barometric pressure measurements.

29. The article of claim 28, wherein said storage medium further comprises instructions to select a signal pattern from among a plurality of candidate signal patterns determined for said LCI.

30. The article of claim 29, wherein said storage medium further comprises instructions to compare said one or more expected altitude values with said altitude measured via said one or more barometric pressure measurements to determine a closest signal pattern match.

31. The article of claim 28, wherein said location of said mobile device is estimated based, at least in part, on a history of said altitude measured via said one or more barometric pressure measurements obtained over a time interval.

32. The article of claim 31, wherein said history of said altitude measured via said one or more barometric pressure measurements comprises a pressure profile for said plurality of predetermined locations within said area.

33. The article of claim 28, wherein said at least one signal pattern matching operation is performed in response to a determination of a coarse location of said mobile device.

34. A method comprising:
obtaining, at a mobile device, positioning assistance data comprising a radio heat map defining a plurality of predetermined locations in an area identified via a location context identifier (LCI), said radio heat map comprising one or more expected barometric pressure values for at least some of said predetermined locations relative to a reference barometric pressure value within said area;
measuring, via a barometric pressure sensor of said mobile device, a barometric pressure of said mobile device relative to said reference barometric pressure value; and
estimating a location of said mobile device based, at least in part, on at least one signal pattern matching operation with respect to said one or more expected barometric pressure values and said barometric pressure of said mobile device measured via said barometric pressure sensor.

35. The method of claim 34, wherein said at least one signal pattern matching operation is based, at least in part, on selecting a signal pattern from among a plurality of candidate signal patterns determined for said LCI.

36. The method of claim 35, wherein said selecting said signal pattern from among said plurality of candidate signal patterns comprises comparing said one or more expected barometric pressure values with said barometric pressure of said mobile device to determine a closest signal pattern match.

37. The method of claim 36, wherein said location of said mobile device is estimated based, at least in part, on at least one of the following: a history of said barometric pressure obtained over a time interval; a history of said barometric pressure obtained over an estimated horizontal distance of travel; a history of maximum and minimum values of said barometric pressure; a history of differences between maximum and minimum values of said barometric pressure; or any combination thereof.

38. The method of claim 34, wherein said one or more expected barometric pressure values are provided in combination with said radio heat map or as a part of said radio heat map.

* * * * *